(12) United States Patent
Mizuno

(10) Patent No.: US 11,276,857 B2
(45) Date of Patent: Mar. 15, 2022

(54) POSITIVE ACTIVE MATERIAL, POSITIVE ELECTRODE, NONAQUEOUS ELECTROLYTE ENERGY STORAGE DEVICE, METHOD OF PRODUCING POSITIVE ACTIVE MATERIAL, AND METHOD OF PRODUCING NONAQUEOUS ELECTROLYTE

(71) Applicant: GS Yuasa International Ltd., Kyoto (JP)

(72) Inventor: Yusuke Mizuno, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 16/965,137

(22) PCT Filed: Feb. 1, 2019

(86) PCT No.: PCT/JP2019/003542
§ 371 (c)(1),
(2) Date: Jul. 27, 2020

(87) PCT Pub. No.: WO2019/163475
PCT Pub. Date: Aug. 29, 2019

(65) Prior Publication Data
US 2021/0043930 A1 Feb. 11, 2021

(30) Foreign Application Priority Data
Feb. 20, 2018 (JP) .............................. JP2018-027919

(51) Int. Cl.
*H01M 4/525* (2010.01)
*C01G 51/00* (2006.01)
(Continued)

(52) U.S. Cl.
CPC ............ *H01M 4/525* (2013.01); *C01G 51/42* (2013.01); *H01M 4/485* (2013.01); *H01M 4/505* (2013.01); *H01M 10/0525* (2013.01); *C01P 2002/72* (2013.01); *C01P 2006/40* (2013.01); *H01M 2004/028* (2013.01)

(58) Field of Classification Search
CPC ..................................................... H01M 4/525
See application file for complete search history.

(56) References Cited

U.S. PATENT DOCUMENTS

2013/0171524 A1 7/2013 Cho et al.
2016/0351905 A1 12/2016 Kawamura et al.

FOREIGN PATENT DOCUMENTS

JP 2015-32514 A 2/2015
JP 2015-32515 A 2/2015
(Continued)

OTHER PUBLICATIONS

Sugie et al. English machine translation of Intl. Pub. No. WO2017/183653A1 (Year: 2017).*
(Continued)

*Primary Examiner* — Peter F Godenschwager
(74) *Attorney, Agent, or Firm* — Rankin, Hill & Clark LLP

(57) ABSTRACT

One aspect of the present invention is a positive active material containing an oxide containing lithium and a transition metal element M, in which the transition metal element M is cobalt, iron, copper, manganese, nickel, chromium, or a combination thereof, and in an X-ray diffraction pattern of the oxide, a ratio (Ia/Ib) of peak intensity Ia appearing in a range where 2θ is 20 to 25° and peak intensity Ib appearing in a range where 2θ is 30 to 35° is 0.2 or more and 0.8 or less.

10 Claims, 2 Drawing Sheets

(51) Int. Cl.
  H01M 4/485    (2010.01)
  H01M 4/505    (2010.01)
  H01M 10/0525  (2010.01)
  H01M 4/02     (2006.01)

(56) References Cited

FOREIGN PATENT DOCUMENTS

| JP | 2015-88268    | A  | 5/2015  |
| JP | 2015-107890   | A  | 6/2015  |
| JP | 2015-130316   | A  | 7/2015  |
| JP | 2015-159098   | A  | 9/2015  |
| JP | 2016-35813    | A  | 3/2016  |
| JP | 2016-35814    | A  | 3/2016  |
| JP | 5904543       | B2 | 4/2016  |
| JP | 2017-69099    | A  | 4/2017  |
| WO | 2014/118834   | A1 | 8/2014  |
| WO | 2015/011883   | A1 | 1/2015  |
| WO | 2015/115052   | A1 | 8/2015  |
| WO | 2017/183653   | A1 | 10/2017 |

OTHER PUBLICATIONS

Kobayashi et al., "Improved performance of Co-doped Li2O cathodes for lithium-peroxide batteries using LiCoO2 as a dopant source", Journal of Power Sources, ELSEVIER, 2016, vol. 306, pp. 567-572.
Kobayashi et al., "Synthesis of Cu-doped Li2O and its cathode properties for lithium-ion batteries based on oxide/peroxide redox reactions", Journal of Power Sorces, ELSEVIER, 2017, vol. 340, pp. 365-372.
Ogasawara et al., "Charge/discharge mechanism of a new Co-doped Li2O cathode material for a rechargeable sealed lithium-peroxide battery analyzed by X-ray absorption spectroscopy", Journal of Power Sources, ELSEVIER, 2015, vol. 287, pp. 220-225.
Harada et al., "Electrochemical reactions and cathode properties of Fe-doped Li2O for the hermetically sealed lithium peroxide battery", Journal of Power Sources, ELSEVIER, 2016, vol. 322, pp. 49-56.
Okuoka et al., "A New Sealed Lithium-Peroxide Battery with a Co-Doped Li2O Cathode in a Superconcentrated Lithium Bis (fluorosulfonyl) amide Electrolyte", Scientific Reports, Jul. 14, 2014, 4 : 5684, DOI: 10.1038/srep05684, pp. 1-6.
Zhu et al., "Anion-redox nanolithia cathodes for Li-ion batteries", Nature Energy, 2016, Article No. 16111, DOI 10.1038/NENERGY. 2016.111, pp. 1-7.
Kobayashi et al., "Cathode Performance of Co-Doped Li2O with Specific Capacity (400 mAh/g) Enhanced by Vinylene Carbonate", Journal of Electrochemical Society, 2017, vol. 164 (4), pp. A750-A753.
International Search Report (ISR) dated May 14, 2019 filed in PCT/JP2019/003542.

\* cited by examiner

POSITIVE ACTIVE MATERIAL, POSITIVE ELECTRODE, NONAQUEOUS ELECTROLYTE ENERGY STORAGE DEVICE, METHOD OF PRODUCING POSITIVE ACTIVE MATERIAL, AND METHOD OF PRODUCING NONAQUEOUS ELECTROLYTE

TECHNICAL FIELD

The present invention relates to a positive active material, a positive electrode, a nonaqueous electrolyte energy storage device, a method of producing a positive active material, and a method of producing a nonaqueous electrolyte energy storage device.

BACKGROUND ART

Nonaqueous electrolyte secondary batteries typified by lithium ion secondary batteries are widely used for electronic devices such as personal computers and communication terminals, automobiles and the like because these secondary batteries have a high energy density. The nonaqueous electrolyte secondary battery generally has a pair of electrodes, electrically separated from each other with a separator, and a nonaqueous electrolyte interposed between the electrodes, and the secondary battery is configured to allow ions to be transferred between both the electrodes for charge-discharge. Capacitors such as a lithium ion capacitor and an electric double layer capacitor are also widely used as nonaqueous electrolyte energy storage devices other than the nonaqueous electrolyte secondary battery.

Various active materials are used for a positive electrode and a negative electrode of the nonaqueous electrolyte energy storage device, and various composite oxides are widely used as a positive active material. As one of the positive active materials, a transition metal solid solution metal oxide in which a transition metal element such as Co or Fe is made into a solid solution in $Li_2O$ has been developed (see Patent Documents 1 and 2). In these patent documents, the transition metal solid solution metal oxide is produced by subjecting $Li_2O$ and $LiCoO_2$, $Co_3O_4$, CoO, and the like to mechanochemical treatment.

PRIOR ART DOCUMENTS

Patent Documents

Patent Document 1: JP-A-2015-107890
Patent Document 2: JP-A-2015-32515

SUMMARY OF THE INVENTION

Problems to be Solved by the Invention

In the above patent documents, a charge-discharge test is not performed with a charge-discharge electric amount of 300 mAh/g or more. However, the inventor has found that in the above-described conventional energy storage device using a transition metal solid solution metal oxide as a positive active material, when the charge-discharge electric amount is large, the discharge capacity is significantly reduced with repeated charge and discharge. Such a positive active material is not preferable in terms of increasing the energy density of the energy storage device and extending the life of the energy storage device.

The present invention has been made in view of the above-described situations, and an object of the present invention is to provide a positive active material having a large discharge capacity even after a charge-discharge cycle, a positive electrode and a nonaqueous electrolyte energy storage device having such a positive active material, a method of producing the positive active material, and a method of producing the nonaqueous electrolyte energy storage device.

Means for Solving the Problems

One aspect of the present invention made to solve the above problem is a positive active material containing an oxide containing lithium and a transition metal element M, in which the transition metal element M is cobalt, iron, copper, manganese, nickel, chromium, or a combination thereof, and in an X-ray diffraction pattern of the oxide, a ratio (Ia/Ib) of peak intensity Ia appearing in a range where $2\theta$ is 20 to 25° and peak intensity Ib appearing in a range where $2\theta$ is 30 to 35° is 0.2 or more and 0.8 or less.

Another aspect of the present invention is a positive electrode for a nonaqueous electrolyte energy storage device having the positive active material.

Another aspect of the present invention is a nonaqueous electrolyte energy storage device including the positive electrode.

Another aspect of the present invention is a method of producing a positive active material, including treating an oxide, containing a lithium transition metal oxide having a crystal structure belonging to an inverse fluorite structure, by a mechanochemical method, in which the lithium transition metal oxide contains cobalt, iron, copper, manganese, nickel, chromium or a combination thereof as a transition metal element M, and a molar ratio (M/(Li+M)) of a content of the transition metal element M to a total content of lithium in the oxide and the transition metal element M is 0.10 or more.

Another aspect of the present invention is a method of producing a nonaqueous electrolyte energy storage device including producing a positive electrode using the positive active material.

Advantages of the Invention

The present invention can provide a positive active material having a large discharge capacity even after a charge-discharge cycle, a positive electrode and a nonaqueous electrolyte energy storage device having such a positive active material, a method of producing the positive active material, and a method of producing the nonaqueous electrolyte energy storage device.

MODE FOR CARRYING OUT THE INVENTION

Figure 1:
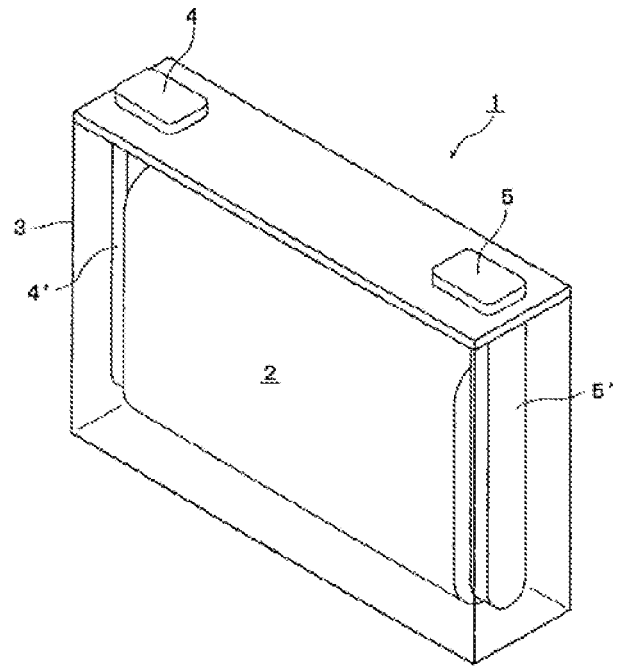
FIG. 1 is an external perspective view showing one embodiment of a nonaqueous electrolyte energy storage device according to the present invention.

A positive active material according to one embodiment of the present invention is a positive active material containing an oxide containing lithium and a transition metal element M, in which the transition metal element M is cobalt, iron, copper, manganese, nickel, chromium, or a combination thereof, and in an X-ray diffraction pattern of the oxide, a ratio (Ia/Ib) of peak intensity Ia appearing in a range where 2θ is 20 to 25° and peak intensity Ib appearing in a range where 2θ is 30 to 35° is 0.2 or more and 0.8 or less.

The nonaqueous electrolyte energy storage device using the positive active material has a large discharge capacity even after a charge-discharge cycle with a charge-discharge electric amount that is as relatively large as, for example, 300 mAh/g. The reason for this is not clear, but the following reason can be surmised. The oxide is presumed to be a composite oxide in which the transition metal element M is made into a solid solution in $Li_2O$. Here, in the X-ray diffraction pattern, a peak appearing in a range where 2θ is 30 to 35° is a peak derived from a crystal structure of $Li_2O$. Furthermore, a peak appearing in a range where 2θ is 20 to 25° is presumed to be a peak that occurs when the transition metal element M is made into a solid solution at a relatively high concentration in the crystal structure of $Li_2O$. That is, it is presumed that when the concentration of the transition metal element M made into a solid solution in the crystal structure of $Li_2O$ increases, a crystal plane is partially formed by the transition metal element M and detected as a diffraction line. For example, the X-ray diffraction pattern of $Li_6CoO_4$ also has a peak in the range where 2θ is 20 to 25°. However, as shown in Examples described later, in the case of $Li_6CoO_4$, or in the case of a mixture of $Li_2O$ and $Li_6CoO_4$, the peak intensity ratio (Ia/Ib) exceeds 0.8. That is, it is conceivable that the peak intensity ratio (Ia/Ib) being 0.2 or more and 0.8 or less means that a sufficient concentration of the transition metal element M is made into a solid solution in the crystal structure of $Li_2O$. It is presumed that in an oxide of the positive active material, a sufficient concentration of the transition metal element M is made into a solid solution as described above, so that a decomposition reaction does not easily occur when the amount of charge is increased, and a state where the discharge capacity is large is maintained even after the charge-discharge cycle with a large electric amount.

The X-ray diffraction measurement of the oxide is performed by powder X-ray diffraction measurement using an X-ray diffractometer ("MiniFlex II" from Rigaku Corporation) under conditions such that a CuKα ray is used as a radiation source, a tube voltage is 30 kV, and a tube current is 15 mA. At this time, the diffracted X-ray passes through a KS filter having a thickness of 30 μm and is detected by a high-speed one-dimensional detector (D/teX Ultra 2). A sampling width is 0.02°, a scan speed is 5°/min, a divergence slit width is 0.625°, a light receiving slit width is 13 mm (OPEN), and a scattering slit width is 8 mm. The obtained X-ray diffraction pattern is subjected to automatic analysis processing using PDXL (analysis software, manufactured by Rigaku Corporation). Here, "background refinement" and "Auto" are selected in a work window of the PDXL software, and refinement is performed such that an intensity error between an actually measured pattern and a calculated pattern is 1500 or less. Background processing is performed by this refinement, and as a value obtained by subtracting a baseline, a value of peak intensity of each diffraction line including Ia and Ib described above, a value of a full width at half maximum, and the like are obtained.

A molar ratio (M/(Li+M)) of a content of the transition metal element M to a total content of the lithium and the transition metal element M in the oxide is preferably 0.10 or more. In this case, it can be said that the transition metal element M is made into a solid solution in a more sufficient concentration, and the discharge capacity after the charge-discharge cycle becomes larger.

In this specification, a composition ratio of the oxide of the positive active material refers to a composition ratio of an oxide which has not been charged or discharged, or an oxide which has been placed in a state of a discharge end by the following method.

First, the nonaqueous electrolyte energy storage device is constant-current charged with a current of 0.05 C until the voltage becomes an end-of-charge voltage during normal use, so that a discharge end state is obtained. After a rest of 30 minutes, constant-current discharge is performed with a current of 0.05 C until a potential of the positive electrode reaches 1.5 V (vs. Li/Li$^+$), and a completely discharged state is obtained. As a result of disassembly, if the battery uses a metal lithium electrode as the negative electrode, the additional operation described below is not performed, and a positive electrode is taken out. If the battery uses a negative electrode other than a metal lithium electrode, in order to accurately control the positive electrode potential, as the additional operation, after the battery is disassembled to take out the positive electrode, a test battery using a metal lithium electrode as the counter electrode is assembled. Constant current discharge is performed at a current value of 10 mA per 1 g of the positive composite until the positive potential reaches 2.0 V (vs. Li/Li$^+$)), and the battery is adjusted to the completely discharged state and then disassembled again to take out the positive electrode. An oxide of the positive active material is collected from the taken-out positive electrode. Here, the term "during normal usage" means use of the nonaqueous electrolyte energy storage device while employing charge-discharge conditions recommended or specified in the nonaqueous electrolyte energy storage device, and when a charger for the nonaqueous electrolyte energy storage device is prepared, this term means use of the nonaqueous electrolyte energy storage device by applying the charger.

The above oxide is preferably represented by the following formula (1). In this case, it can be said that in the crystal structure of $Li_2O$, the transition metal element M in a state of being replaced with Li is made into a solid solution in a sufficient concentration, and the discharge capacity after the charge-discharge cycle becomes larger.

$$[Li_{2-2y}M_{2x}]O \qquad (1)$$

(In the above formula (1), M is Co, Fe, Cu, Mn, Ni, Cr or a combination thereof. x and y satisfy 0.10≤x<1 and x≤y<1.)

The positive electrode according to one embodiment of the present invention is a positive electrode for a nonaqueous electrolyte energy storage device having the positive active material. Since the positive electrode has the positive active material, the nonaqueous electrolyte energy storage device using the positive electrode has a large discharge capacity even after the charge-discharge cycle.

The nonaqueous electrolyte energy storage device according to one embodiment of the present invention is a nonaqueous electrolyte energy storage device (hereinafter also simply referred to as "energy storage device") including the positive electrode. The energy storage device has a large discharge capacity even after the charge-discharge cycle.

A method of producing a positive active material according to one embodiment of the present invention is a method of producing a positive active material, including treating an oxide, containing a lithium transition metal oxide having a crystal structure belonging to an inverse fluorite structure, by a mechanochemical method, in which the lithium transition metal oxide contains cobalt, iron, copper, manganese, nickel, chromium or a combination thereof as a transition metal element M, and a molar ratio (M/(Li+M)) of a content of the transition metal element M to a total content of lithium and the transition metal element M in the oxide is 0.10 or more.

According to the production method, a positive active material having a large discharge capacity even after the charge-discharge cycle can be produced. The reason for this is not clear, but the following reason can be surmised. A cation of the lithium transition metal oxide having a crystal structure belonging to the inverse fluorite structure is four-coordinate. The crystal structure of $Li_2O$ is also the inverse fluorite structure, and the cation is four-coordinate. Thus, in the reaction of synthesizing $Li_2O$ in which the transition metal element M is made into a solid solution from the lithium transition metal oxide having a crystal structure belonging to the inverse fluorite structure, a coordination number of the cation does not change. For this reason, it is presumed that a positive electrode in which a sufficient concentration of the transition metal element M is made into a solid solution in the crystal structure of $Li_2O$ is obtained by treatment using the mechanochemical method. It is presumed that in such a positive active material, as described above, the decomposition reaction does not easily occur when the amount of charge is increased, and the state where the discharge capacity is large is maintained even after the charge-discharge cycle with a large electric amount. On the other hand, as in the prior art, for example, when $LiCoO_2$ or the like having a rock salt type crystal structure in which the cation is six-coordinate is used as a material, in order to make Co of $LiCoO_2$ into a solid solution in a Li site of $Li_2O$, a large reaction energy is required to change from six-coordination to four-coordination. For this reason, it is presumed that in the prior art, a positive active material in which a sufficient concentration of the transition metal element M is made into a solid solution and which has a large discharge capacity even after the charge-discharge cycle cannot be obtained.

The method of producing a nonaqueous electrolyte energy storage device according to one embodiment of the present invention is a method of producing a nonaqueous electrolyte energy storage device using the positive active material. According to the production method, an energy storage device having a large discharge capacity even after the charge-discharge cycle can be produced.

Hereinafter, the positive active material, the method of producing a positive active material, the positive electrode, the nonaqueous electrolyte energy storage device, and the method of producing a nonaqueous electrolyte energy storage device according to one embodiment of the present invention will be described in order.

<Positive Active Material>

The positive active material according to one embodiment of the present invention contains an oxide containing lithium and the transition metal element M. The transition metal element M is cobalt, iron, copper, manganese, nickel, chromium, or a combination thereof. In the positive active material, in the X-ray diffraction pattern of the oxide, the ratio (Ia/Ib) of the peak intensity Ia appearing in the range where 2θ is 20 to 25° and the peak intensity Ib appearing in the range where 2θ is 30 to 35° is 0.2 or more and 0.8 or less.

The transition metal element M preferably contains Co, Mn, Fe or a combination thereof, and more preferably contains Co, and Co is still more preferable.

In the X-ray diffraction pattern of the oxide, the lower limit of the ratio (Ia/Ib) of the peak intensity Ia appearing in the range where 2θ is 20 to 25° and the peak intensity Ib appearing in the range where 2θ is 30 to 35° is 0.2, preferably 0.3, more preferably 0.4, and still more preferably 0.5. On the other hand, the upper limit of the ratio (Ia/Ib) is 0.8, preferably 0.7, more preferably 0.6, and still more preferably 0.55. When the ratio of the peaks is within the above range, the discharge capacity after the charge-discharge cycle can be further increased.

Thus, the ratio (Ia/Ib) is preferably 0.3 or more and 0.7 or less, more preferably 0.4 or more and 0.6 or less, and still more preferably 0.5 or more and 0.55 or less.

In the X-ray diffraction pattern of the oxide, the lower limit of a full width at half maximum (FWHMa) of the peak appearing in the range where 2θ is 20 to 25° is preferably 2.3°, and more preferably 2.6°. When the full width at half maximum is equal to or more than the lower limit, the discharge capacity after the charge-discharge cycle can be further increased. The upper limit of the FWHMa may be 5° or 4°. In this case, the full width at half maximum (FWHMb) of the peak appearing in the range where 2θ is 30 to 35° may be 0.4° or more, or may be 0.6° or more. Furthermore, this full width at half maximum may be 1° or less.

The lower limit of the molar ratio (M/(Li+M)) of the content of the transition metal element M to the total content of lithium and the transition metal element M in the oxide is preferably 0.10, more preferably 0.12, still more preferably 0.13, and even more preferably 0.14. By setting the molar ratio to be equal to or more than the above lower limit, the concentration of the transition metal element M can be further increased, and the discharge capacity after the charge-discharge cycle can be further increased.

On the other hand, the upper limit of the molar ratio (M/(Li+M)) is preferably 0.4, more preferably 0.3, and still more preferably 0.2. By setting the molar ratio to be equal to or less than the above upper limit, the discharge capacity can be further increased. Furthermore, by setting the molar ratio to be equal to or less than the above upper limit, productivity can be increased, and, for example, production by treatment using the mechanochemical method using lithium transition metal oxide having a crystal structure belonging to the inverse fluorite structure becomes efficient.

For these reasons, the molar ratio (M/(Li+M)) is preferably 0.10 or more and 0.4 or less, more preferably 0.12 or more and 0.3 or less, still more preferably 0.13 or more and 0.2 or less, and even more preferably 0.14 or more and 0.2 or less.

The oxide may further contain elements other than Li, O, and the transition metal element M. However, the lower limit of a total molar ratio of Li, O, and the transition metal element M in the oxide is preferably 70 mol %, more preferably 90 mol %, and still more preferably 99 mol %. Preferably, the oxide is substantially formed of Li, O, and the transition metal element M. When the oxide has such a composition, the discharge capacity can be further increased.

The above oxide is preferably represented by the following formula (1):

$$[Li_{2-2y}M_{2x}]O \qquad (1)$$

(wherein M is Co, Fe, Cu, Mn, Ni, Cr or a combination thereof, and x and y satisfy $0.10 \leq x < 1$ and $x \leq y < 1$).

x in the above formula (1) relates to the content of the transition metal element M made into a solid solution in $Li_2O$. The lower limit of x is preferably 0.11, and more preferably 0.12. On the other hand, the upper limit of x is preferably 0.4, more preferably 0.3, and still more preferably 0.2.

Thus, x in the above formula (1) is preferably 0.11 or more and 0.4 or less, more preferably 0.12 or more and 0.3 or less, and still more preferably 0.12 or more and 0.2 or less.

y in the above formula (1) relates to the Li content. When x=y holds, there is established a relationship such that a part of the lithium site of $Li_2O$ is substituted with the transition metal element M. However, from the relation of the valence of the transition metal element M, the effect is not affected even if x<y. The lower limit of y is preferably 0.15, more preferably 0.18, still more preferably 0.2, and even more preferably 0.23. On the other hand, the upper limit of y is preferably 0.5, more preferably 0.4, and still more preferably 0.3.

Thus, y in the above formula (1) is preferably 0.15 or more and 0.5 or less, more preferably 0.18 or more and 0.4 or less, still more preferably 0.2 or more and 0.3 or less, and even more preferably 0.23 or more and 0.3 or less.

The oxide preferably has a crystal structure belonging to the inverse fluorite structure. The oxide preferably has a structure in which the transition metal element M is made into a solid solution in the crystal structure of $Li_2O$ having an inverse fluorite structure. The crystal structure of the oxide can be specified by a known analysis method based on an X-ray diffraction pattern.

The positive active material may contain components other than the above oxide. However, the lower limit of the content of the oxide in the positive active material is preferably 70% by mass, more preferably 90% by mass, and still more preferably 99% by mass. The upper limit of the content of this oxide may be 100% by mass. The positive active material may be substantially composed of only the above oxide. As described above, since most of the positive active material is composed of the oxide, the discharge capacity after the charge-discharge cycle can be further increased.

<Method of Producing Positive Active Material>

The positive active material can be produced, for example, by the following method. That is, the method of producing a positive active material according to one embodiment of the present invention includes treating an oxide, containing a lithium transition metal oxide having a crystal structure belonging to an inverse fluorite structure, by a mechanochemical method, in which the lithium transition metal oxide contains cobalt, iron, copper, manganese, nickel, chromium or a combination thereof as a transition metal element M, and a molar ratio (M/(Li+M)) of a content of the transition metal element M to a total content of lithium and the transition metal element M in the oxide is 0.10 or more.

The mechanochemical method (also referred to as mechanochemical treatment or the like) refers to a synthesis method utilizing a mechanochemical reaction. The mechanochemical reaction refers to a chemical reaction such as a crystallization reaction, a solid solution reaction, or a phase transition reaction that utilizes high energy locally generated by mechanical energy such as friction and compression during a crushing process of a solid substance. In this production method, it is presumed that a reaction for forming a structure in which the transition metal element M is made into a solid solution in the crystal structure of $Li_2O$ is caused by treatment using the mechanochemical method. Examples of apparatuses for performing the mechanochemical method include pulverizers/dispersers such as a ball mill, a bead mill, a vibration mill, a turbo mill, a mechano-fusion, and a disk mill. Among them, the ball mill is preferable. As the ball mill, those made of tungsten carbide (WC) and those made of zirconium oxide ($ZrO_2$) can be preferably used.

The treatment by the mechanochemical method can be performed in an inert gas atmosphere such as argon or an active gas atmosphere, but is preferably performed in the inert gas atmosphere.

The material provided for the treatment by the mechanochemical method is an oxide containing a lithium transition metal oxide having a crystal structure belonging to the inverse fluorite structure. The oxide used as this material may be only a lithium transition metal oxide having a crystal structure belonging to the inverse fluorite structure, or a mixture of a lithium transition metal oxide having a crystal structure belonging to the inverse fluorite structure with another oxide. Alternatively, a mixture of plural types of the lithium transition metal oxides having a crystal structure belonging to the inverse fluorite structure may be used. The type and mixing ratio of oxide to be used are adjusted so that the molar ratio (M/(Li+M)) of the content of the transition metal element M to the total content of lithium and the transition metal element M contained in the entirety of one or two or more oxides used as a material is 0.10 or more.

Examples of the lithium transition metal oxide having a crystal structure belonging to the inverse fluorite structure include composite oxides of lithium and the transition metal element M, such as $Li_6CoO_4$, $Li_6MnO_4$, and $Li_5FeO_4$.

As the other oxide, a lithium oxide such as $Li_2O$ is preferable, and $Li_2O$ is more preferable.

<Positive Electrode>

The positive electrode according to one embodiment of the present invention is a positive electrode for a nonaqueous electrolyte energy storage device having the positive active material described above. The positive electrode has a positive substrate and a positive active material layer disposed directly or via an intermediate layer on the positive substrate.

The positive substrate has conductivity. As the material of the substrate, a metal such as aluminum, titanium, tantalum, or stainless steel, or an alloy thereof is used. Among these materials, aluminum and an aluminum alloy are preferred for the balance among the potential resistance, conductivity level, and cost. Exemplified as a form of the positive substrate are a foil and a deposited film, and a foil is preferred in terms of costs. That is, an aluminum foil is preferred as the positive substrate. Examples of aluminum and the aluminum alloy include A1085P and A3003P specified in JIS-H-4000 (2014).

The intermediate layer is a covering layer on the surface of the positive substrate, and reduces contact resistance between the positive substrate and the positive active material layer by including conductive particles such as carbon particles. The configuration of the intermediate layer is not particularly limited, and can be formed from, for example, a composition containing a resin binder and conductive particles. Having "conductivity" means having a volume resistivity of $10^7$ Ω·cm or less that is measured in accordance with JIS-H-0505 (1975), and the term "non-conductivity" means that the volume resistivity is more than $10^7$ Ω·cm.

The positive active material layer is formed from a so-called positive composite containing a positive active material. The positive composite that forms the positive active material layer contains optional components such as a conductive agent, a binder (binding agent), a thickener and a filler as necessary.

The positive active material includes the positive active material described above. As the positive active material, a well-known positive active material other than this positive active material may be included. The content ratio of the positive active material in the total positive active material is preferably 50% by mass or more, more preferably 70% by mass or more, still more preferably 90% by mass or more, and even more preferably 99% by mass or more. By increasing the content ratio of the positive active material, the discharge capacity can be sufficiently increased. The content ratio of the positive active material in the positive active material layer can be, for example, 30% by mass or more and 95% by mass or less.

The conductive agent is not particularly limited as long as it is a conductive material. Examples of such a conductive agent include a carbonaceous material; a metal; and a conductive ceramic. Examples of the carbonaceous material include graphite and carbon black. Examples of the kind of carbon black include furnace black, acetylene black, and Ketjen black. Among them, a carbonaceous material is preferable from the viewpoint of conductivity and coatability. Among them, acetylene black and Ketjen black are preferable. Examples of the shape of the conductive agent include a powdery shape, a sheet shape, and a fibrous shape.

Examples of the binder (binding agent) include thermoplastic resins such as fluororesins (polytetrafluoroethylene (PTFE), polyvinylidene fluoride (PVDF) and the like), polyethylene, polypropylene and polyimide; elastomers such as ethylene-propylene-diene rubber (EPDM), sulfonated EPDM, styrene butadiene rubber (SBR) and fluorine rubber; and polysaccharide polymers.

Examples of the thickener include polysaccharide polymers such as carboxymethylcellulose (CMC) and methylcellulose. When the thickener has a functional group reactive with lithium, it is preferable to deactivate the functional group by methylation or the like in advance.

The filler is not particularly limited as long as it is a filler that does not adversely affect the energy storage device performance. Examples of the main component of the filler include polyolefins such as polypropylene and polyethylene, silica, alumina, zeolite and glass.

<Nonaqueous Electrolyte Energy Storage Device>

The energy storage device according to an embodiment of the present invention has a positive electrode, a negative electrode, and a nonaqueous electrolyte. Hereinafter, a nonaqueous electrolyte secondary battery (hereinafter also simply referred to as "secondary battery") will be described as an example of an energy storage device. The positive electrode and the negative electrode usually form an electrode assembly alternately superposed by stacking or winding with a separator interposed therebetween. The electrode assembly is housed in a case, and the case is filled with the nonaqueous electrolyte. The nonaqueous electrolyte is interposed between the positive electrode and the negative electrode. As the case, a known metal case, a resin case or the like, which is usually used as a case of a secondary battery, can be used.

(Positive Electrode)

The positive electrode included in the secondary battery is as described above.

(Negative Electrode)

The negative electrode has a negative substrate and a negative active material layer disposed directly or via an intermediate layer on the negative substrate. The intermediate layer may have the same configuration as the intermediate layer of the positive electrode.

The negative substrate may have the same configuration as the positive substrate. However, as the material of the negative substrate, metals such as copper, nickel, stainless steel, and nickel-plated steel or alloys thereof are used, and copper or a copper alloy is preferable. That is, a copper foil is preferred as the negative substrate. Examples of the copper foil include rolled copper foils and electrolytic copper foils.

The negative active material layer is formed from a so-called negative composite containing a negative active material. The negative composite that forms the negative active material layer contains optional components such as a conductive agent, a binder (binding agent), a thickener and a filler as necessary. As regards the optional component such as a conducting agent, a binder (binding agent), a thickener, or a filler, it is possible to use the same component as in the positive active material layer.

As the negative active material, a material capable of absorbing and releasing lithium ions is normally used. Specific examples of the negative active material include metals or metalloids such as Si and Sn; metal oxides or metalloid oxides such as an Si oxide and an Sn oxide; a polyphosphoric acid compound; and carbon materials such as graphite and non-graphitic carbon (easily graphitizable carbon or hardly graphitizable carbon).

The negative composite (negative active material layer) may also contain a typical nonmetal element such as B, N, P, F, Cl, Br, or I, a typical metal element such as Li, Na, Mg, Al, K, Ca, Zn, Ga, or Ge, or a transition metal element such as Sc, Ti, V, Cr, Mn, Fe, Co, Ni, Cu, Mo, Zr, Ta, Hf, Nb, or W.

(Separator)

As a material of the separator, for example, a woven fabric, a nonwoven fabric, a porous resin film or the like is used. Among them, a porous resin film is preferable from the viewpoint of strength, and a nonwoven fabric is preferable from the viewpoint of liquid retainability of the nonaqueous electrolyte. As a main component of the separator, a polyolefin such as polyethylene or polypropylene is preferable from the viewpoint of strength, and polyimide, aramid or the like is preferable from the viewpoint of resistance to oxidation and decomposition. These resins may be combined.

An inorganic layer may be disposed between the separator and the electrode (normally the positive electrode). The inorganic layer is a porous layer that is also called a heat-resistant layer or the like. It is also possible to use a separator with an inorganic layer formed on one surface of a porous resin film. The inorganic layer normally includes inorganic particles and a binder, and may contain other components.

(Nonaqueous Electrolyte)

As the nonaqueous electrolyte, a known nonaqueous electrolyte that is normally used in a common nonaqueous electrolyte secondary battery can be used. The nonaqueous electrolyte contains a nonaqueous solvent, and an electrolyte salt dissolved in the nonaqueous solvent.

As the nonaqueous solvent, a known nonaqueous solvent that is normally used as a nonaqueous solvent of a common nonaqueous electrolyte for a secondary battery can be used. Examples of the nonaqueous solvent include cyclic carbonate, linear carbonate, esters, ethers, amides, sulfone, lactones and nitriles. Among these nonaqueous solvents, it is preferable to use at least cyclic carbonate or chain carbonate, and it is more preferable to use cyclic carbonate and chain carbonate in combination.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, catechol carbonate, 1-phenylvinylene carbonate and 1,2-diphenylvinylene carbonate, and among them, EC is preferable.

Examples of the chain carbonate include diethyl carbonate (DEC), dimethyl carbonate (DMC), ethyl methyl carbonate (EMC) and diphenyl carbonate, and among them, DMC and EMC are preferable.

Examples of the electrolyte salt include lithium salts, sodium salts, potassium salts, magnesium salts and onium salts, with lithium salts being preferable. Examples of the lithium salt include inorganic lithium salts such as $LiPF_6$, $LiPO_2F_2$, $LiBF_4$, $LiPF_2(C_2O_4)_2$, $LiClO_4$, and $LiN(SO_2F)_2$, and lithium salts having a fluorinated hydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F_5)_3$.

Other additives may be added to the nonaqueous electrolyte. As the nonaqueous electrolyte described above, a salt that is melted at normal temperature, an ionic liquid, a polymer solid electrolyte, an inorganic solid electrolyte, or the like can also be used.

<Method of Producing Nonaqueous Electrolyte Energy Storage Device>

The energy storage device can be produced by using the above positive active material. For example, the method of producing the energy storage device includes a step of preparing a positive electrode, a step of preparing a negative electrode, a step of preparing a nonaqueous electrolyte, a step of forming an electrode assembly in which the positive electrode and the negative electrode are alternately superposed by stacking or winding the positive electrode and the negative electrode with a separator interposed between the electrodes, a step of housing the positive electrode and the negative electrode (electrode assembly) in a case, and a step of injecting the nonaqueous electrolyte into the case. The energy storage device can be obtained by sealing an injection port after the injection.

The positive active material is used in the step of preparing the positive electrode. The positive electrode can be produced by, for example, applying a positive composite paste directly or via an intermediate layer to the positive substrate and drying the paste. The positive composite paste contains each component constituting the positive composite, such as a positive active material.

Other Embodiments

The present invention is not limited to the aforementioned embodiments, and, in addition to the aforementioned embodiments, can be carried out in various modes with alterations and/or improvements being made. For example, in the positive electrode of the nonaqueous electrolyte energy storage device, the positive composite is not required to form a distinct layer. For example, the positive electrode may have a structure in which a positive composite is carried on a mesh-shaped positive substrate.

In the above-described embodiment, an embodiment in which the nonaqueous electrolyte energy storage device is a nonaqueous electrolyte secondary battery has been mainly described, but the nonaqueous electrolyte energy storage device may be one other than a nonaqueous electrolyte secondary battery. Examples of another nonaqueous electrolyte energy storage device include capacitors (electric double layer capacitors and lithium ion capacitors).

FIG. 1 is a schematic view of a rectangular nonaqueous electrolyte energy storage device 1 (nonaqueous electrolyte secondary battery) as one embodiment of the nonaqueous electrolyte energy storage device according to the present invention. FIG. 1 is a view showing an inside of a case in a perspective manner. In the nonaqueous electrolyte energy storage device 1 shown in FIG. 1, an electrode assembly 2 is housed in a battery case 3. The electrode assembly 2 is formed by winding a positive electrode, including a positive composite containing positive active material, and a negative electrode, including a negative active material, with a separator interposed between the electrodes. The positive electrode is electrically connected to a positive electrode terminal 4 through a positive electrode lead 4', and the negative electrode is electrically connected to a negative electrode terminal 5 through a negative electrode lead 5'. The positive active material according to one embodiment of the present invention is used as the active material of the positive electrode. A nonaqueous electrolyte is injected in the battery case 3.

Figure 2:
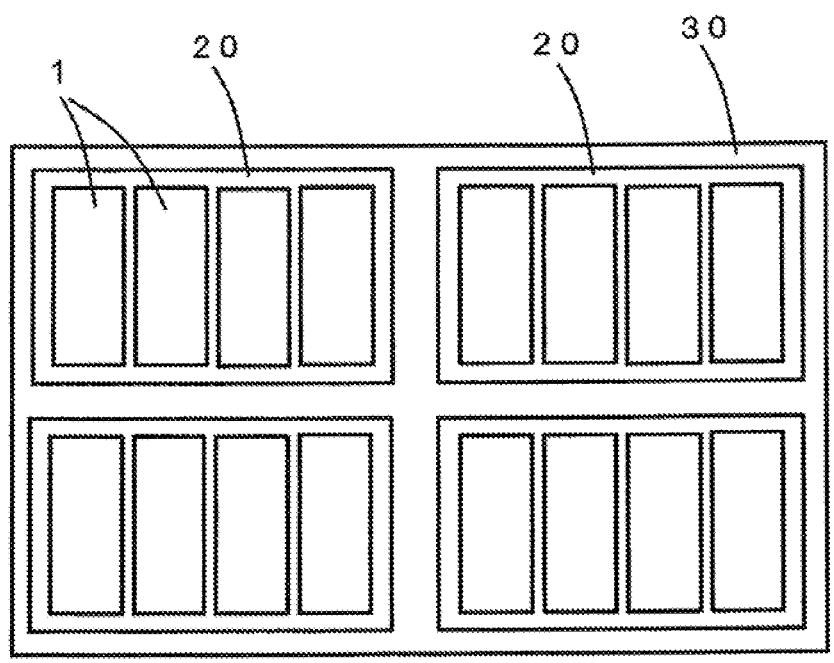
FIG. 2 is a schematic diagram showing an energy storage apparatus including a plurality of the nonaqueous electrolyte energy storage devices according to the present invention.

The configuration of the nonaqueous electrolyte energy storage device according to the present invention is not particularly limited, and examples include cylindrical batteries, prismatic batteries (rectangular batteries) and flat batteries. The present invention can also be implemented as an energy storage apparatus including a plurality of the nonaqueous electrolyte energy storage devices as described above. FIG. 2 shows one embodiment of an energy storage apparatus. In FIG. 2, an energy storage apparatus 30 includes a plurality of energy storage units 20. Each of the energy storage units 20 includes a plurality of the nonaqueous electrolyte energy storage devices 1. The energy storage apparatus 30 can be mounted as a power source for an automobile such as an electric vehicle (EV), a hybrid vehicle (HEV), a plug-in hybrid vehicle (PHEV), or the like.

EXAMPLES

Hereinafter, the present invention will be described further in detail by way of examples, but the present invention is not limited to the following examples.

Synthesis Example 1

Synthesis of $Li_6CoO_4$

After $Li_2O$ and CoO were mixed at a molar ratio of 3:1, the mixture was fired at 900° C. for 20 hours under a nitrogen atmosphere to synthesize $Li_6CoO_4$.

Example 1

The obtained $Li_6CoO_4$ was placed in a WC pot having an inner volume of 80 mL and containing 250 g of tungsten carbide (WC) balls having a diameter of 5 mm in an argon atmosphere, and the pot was closed with a lid. The pot was set in a planetary ball mill ("pulverisette 5" from FRITSCH) and dry-pulverized at a revolution speed of 400 rpm for 8 hours. A positive active material of Example 1 was obtained by treatment using the mechanochemical method as described above.

Example 2 and Comparative Examples 1 to 4

Each positive active material of Example 2 and Comparative Examples 1 to 4 was obtained in the same manner as in Example 1, except that materials subjected to the treatment by the mechanochemical method were as shown in Table 1. Mixing ratios of the materials shown in Table 1 are molar ratios.

(X-Ray Diffraction Measurement)

Figure 3:
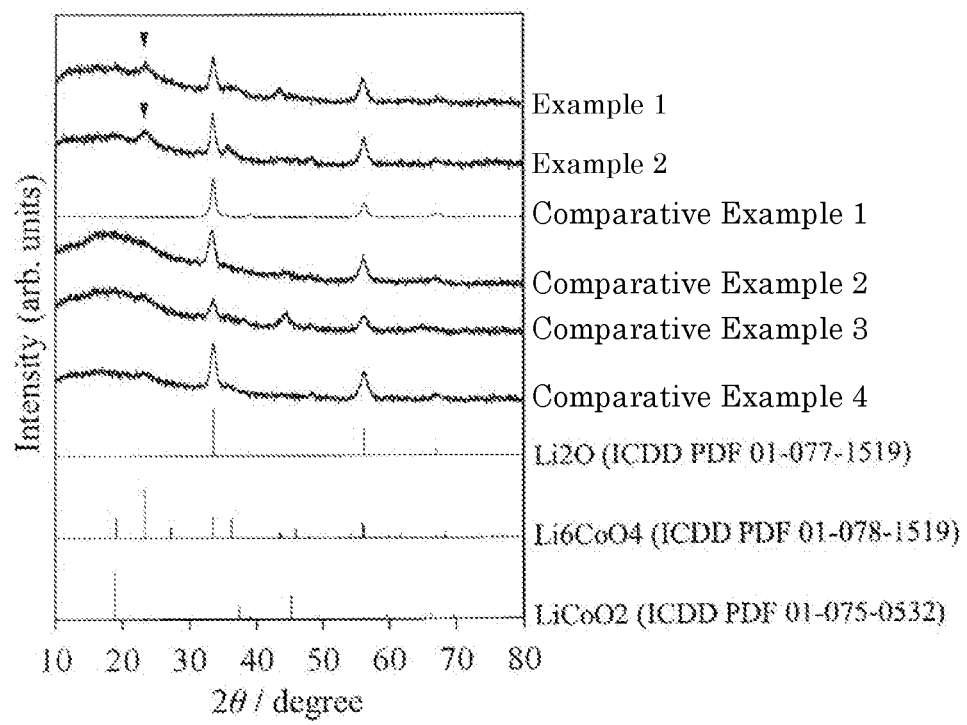
FIG. 3 is an X-ray diffraction pattern of each positive active material (oxide) obtained in Examples 1 and 2 and Comparative Examples 1 to 4.

X-ray diffraction measurement was performed on each positive active material (oxide) obtained in the above Examples and Comparative Examples. A powder sample was filled under an argon atmosphere using an airtight sample holder for X-ray diffraction measurement. An X-ray diffractometer used, measurement conditions, and a data processing method were as described above. FIG. 3 shows each X-ray diffraction pattern.

Each X-ray diffraction pattern in FIG. 3 shows that the main phases of all positive active materials (oxides) belong to an inverse fluorite crystal structure. It can be estimated that all the positive active materials (oxides) are composite oxides in which cobalt is made into a solid solution in $Li_2O$. Specifically, it can be estimated that the positive active material of Example 1 is $Li_{1.5}Co_{0.25}O$ (the compound represented by the formula (1): x=0.125, y=0.250), and the positive active material of Example 2 is $Li_{1.571}Co_{0.214}O$ (the compound represented by the formula (1): x=0.107, y=0.215).

From the above-described X-ray diffraction pattern, the peak intensity Ia appearing in the range where 2θ is 20 to 25°, the peak intensity Ib appearing in the range where 2θ is 30 to 35°, and the ratio (Ia/Ib) of these peak intensities were obtained. From FIG. 3, it can be confirmed that in Examples 1 and 2, the peak (▼) in the range where 2θ is 20 to 25° clearly appears. Also in Comparative Examples 3 and 4, it can be confirmed that the peak in the range where 2θ is 20 to 25° slightly appears. Table 1 shows measured values. The X-ray diffraction pattern of a simple mixture in which the molar ratio of $Li_6CoO_4$ as Reference Example 1 not treated by the mechanochemical method and $Li_2O$ as Reference Example 2 not treated by the mechanochemical method, and $Li_6CoO_4$ was 3:2 was measured by the above method. Table 1 also shows the measured values of Ia, Ib and Ia/Ib, the full width at half maximum (FWHMa) of the peak appearing in the range where 2θ is 20 to 25°, and the full width at half maximum (FWHMb) of the peak appearing in the range where 2θ is 30 to 35°.

As shown in Table 1, in the positive active materials of Examples 1 and 2, the peak ratio Ia/Ib is in the range of 0.2 or more and 0.8 or less. On the other hand, when $Li_2O$ and $LiCoO_2$ were used for the material which were the prior arts as in Comparative Examples 2 and 3, or when the content ratio of Co which was the transition metal element M was small as Comparative Example 4, the result is the peak ratio Ia/Ib falling below 0.2. As shown in Reference Examples 1 and 2, in the mixture of $Li_6CoO_4$ and $Li_2O$ that had not been treated by the mechanochemical method and $Li_6CoO_4$, the result was the peak ratio Ia/Ib exceeding 0.8. An oxide containing a lithium transition metal oxide having a crystal structure belonging to the inverse fluorite structure is treated by the mechanochemical method, and when the molar ratio (M/(Li+M)) of the content of the transition metal element M to the total content of lithium and the transition metal element M in the oxide is 0.10 or more, it can be seen that an oxide (positive active material) having a peak ratio (Ia/Ib) of 0.2 or more and 0.8 or less can be obtained.

(Production of Positive Electrode)

The positive active material obtained in each of Examples and Comparative Examples and acetylene black were mixed at a mass ratio of 1:1 and placed in a WC pot having an inner volume of 80 mL and containing 250 g of WC balls having a diameter of 5 mm, and the pot was closed with a lid. The pot was set in a planetary ball mill ("pulverisette 5" from FRITSCH) and dry-pulverized at a revolution speed of 200 rpm for 2 hours to prepare a mixed powder of the positive active material and acetylene black.

A solution obtained by dissolving a PVDF powder in an N-methyl-2-pyrrolidone (NMP) solvent was added to the obtained mixed powder of the positive active material and acetylene black to prepare a positive composite paste. A mass ratio of the positive active material, acetylene black, and PVDF in the positive composite paste was 2:2:1 (in terms of solid content). The positive composite paste was applied to a mesh-shaped aluminum substrate, dried under vacuum, and then pressed to obtain a positive electrode.

(Production of Nonaqueous Electrolyte Energy Storage Device (Evaluation Cell))

$LiPF_6$ was dissolved at a concentration of 1 mol/dm³ in a nonaqueous solvent in which EC, DMC, and EMC were mixed at a volume ratio of 30:35:35 to prepare a nonaqueous electrolyte. Using the positive electrode and the nonaqueous electrolyte, and using the negative electrode and a reference

TABLE 1

|  | Material | [Co]/[Li + Co] | $[Li_{2-2y}M_{2x}]O$ | x | y | Ia | Ib | Ia/Ib | FWHM a | FWHM b |
|---|---|---|---|---|---|---|---|---|---|---|
| Example 1 | $Li_6CoO_4$ | 0.14 | $Li_{1.5}Co_{0.25}O$ | 0.125 | 0.250 | 863 | 1672 | 0.516 | 2.89(17) | 0.90(2) |
| Example 2 | $2Li_2O + 3Li_6CoO_4$ | 0.12 | $Li_{1.571}Co_{0.214}O$ | 0.107 | 0.215 | 1160 | 2181 | 0.532 | 3.48(19) | 0.82(2) |
| Comparative Example 1 | $Li_2O$ | 0 | $Li_2O$ | 0 | 0 | None | 2834 | — | — | 0.673(31) |
| Comparative Example 2 | $41Li_2O + 9LiCoO_2$ | 0.09 | $Li_{1.542}Co_{0.153}O$ | 0.076 | 0.229 | None | 1854 | — | — | 1.04(3) |
| Comparative Example 3 | $5Li_2O + 2LiCoO_2$ | 0.14 | $Li_{1.333}Co_{0.222}O$ | 0.111 | 0.333 | 195 | 1056 | 0.185 | 1.8(2) | 1.25(9) |
| Comparative Example 4 | $37Li_2O + 18Li_6CoO_4$ | 0.09 | $Li_{1.670}Co_{0.165}O$ | 0.083 | 0.165 | 236 | 2834 | 0.083 | 2.1(2) | 0.94(3) |
| Reference Example 1 | $Li_6CoO_4$ (Untreated) | 0.14 | — | — | — | 21053 | 14910 | 1.412 | 0.1250(13) | 0.1243(17) |
| Reference Example 2 | $3Li_2O + 2Li_6CoO_4$ (Untreated; simple mixture) | 0.10 | — | — | — | 19757 | 23907 | 0.826 | 0.147(2) | 0.097(2) | electrode as lithium metal, a three-electrode beaker cell as an evaluation cell (energy storage device) was produced. All operations from the production of the positive electrode to the production of the evaluation cell were performed in an argon atmosphere.

(Charge-Discharge Cycle Test)

With respect to the evaluation cells obtained using the respective positive active materials, a charge-discharge test was performed in a 25° C. temperature environment in a glove box under an argon atmosphere. A current density was set to 20 mA/g per mass of the positive active material contained in the positive electrode, and constant current (CC) charge-discharge was performed. The charge was terminated when the electric amount reached 300 mAh/g which was the upper limit or the potential reached 3.5 V (vs. Li/Li$^+$) which was the upper limit. The discharge was terminated when the electric amount reached 300 mAh/g which was the upper limit or the potential reached 1.5 V (vs. Li/Li$^+$) which was the lower limit. In Example 1 and Comparative Examples 1 and 2, a 20-cycle charge-discharge cycle test was performed. In Example 2 and Comparative Examples 3 and 4, a 10-cycle charge-discharge cycle test was performed. Table 2 shows the amount of charge in the first cycle and the discharge capacities in the first, tenth, and twentieth cycles.

3: Battery case
4: Positive electrode terminal
4': Positive electrode lead
5: Negative electrode terminal
5': Negative electrode lead
20: Energy storage unit
30: Energy storage apparatus

The invention claimed is:

1. A positive active material containing an oxide containing lithium and a transition metal element M,
wherein
the transition metal element M is cobalt, iron, copper, manganese, nickel, chromium, or a combination thereof, and
in an X-ray diffraction pattern of the oxide, a ratio (Ia/Ib) of peak intensity Ia appearing in a range where 2θ is 20 to 25° and peak intensity Ib appearing in a range where 2θ is 30 to 35° is 0.2 or more and 0.8 or less.

2. The positive active material according to claim 1, wherein a molar ratio (M/(Li+M)) of a content of the transition metal element M to a total content of the lithium and the transition metal element M in the oxide is 0.10 or more.

TABLE 2

| | Material | [Co]/[Li + Co] | [Li$_{2-2y}$M$_{2x}$]O | 1st charge amount mAh/g | 1st discharge capacity mAh/g | 10th discharge capacity mAh/g | 20th discharge capacity mAh/g |
|---|---|---|---|---|---|---|---|
| Example 1 | Li$_6$CoO$_4$ | 0.14 | Li$_{1.5}$Co$_{0.25}$O | 300 | 300 | 300 | 300 |
| Example 2 | 2Li$_2$O + 3Li$_6$CoO$_4$ | 0.12 | Li$_{1.571}$Co$_{0.214}$O | 300 | 300 | 270 | — |
| Comparative Example 1 | Li$_2$O | 0 | Li$_2$O | 100 | 68.5 | 37.5 | 27.1 |
| Comparative Example 2 | 41Li$_2$O + 9Li$_6$CoO$_2$ | 0.09 | Li$_{1.542}$Co$_{0.153}$O | 300 | 300 | 178 | 131 |
| Comparative Example 3 | 5Li$_2$O + 2LiCoO$_2$ | 0.14 | Li$_{1.333}$Co$_{0.222}$O | 300 | 300 | 161 | — |
| Comparative Example 4 | 37Li$_2$O + 18Li$_6$CoO$_4$ | 0.09 | Li$_{1.670}$Co$_{0.165}$O | 300 | 300 | 154 | — |
| Reference Example 1 | Li$_6$CoO$_4$ (Untreated) | 0.14 | — | — | — | — | — |
| Reference Example 2 | 3Li$_2$O + 2Li$_6$CoO$_4$ (Untreated; simple mixture) | 0.10 | — | — | — | — | — |

As shown in Table 2, in Examples 1 and 2, the discharge capacity in the tenth cycle is large, and particularly, in Example 1, a large discharge capacity is maintained even in the twentieth cycle. It can be seen that the positive active materials of Examples 1 and 2 have a large discharge capacity even after the charge-discharge cycle.

INDUSTRIAL APPLICABILITY

The present invention can be applied to nonaqueous electrolyte energy storage devices to be used as power sources for electronic devices such as personal computers and communication terminals, automobiles and the like, and electrodes, positive active materials, and the like included in the nonaqueous electrolyte energy storage device.

DESCRIPTION OF REFERENCE SIGNS

1: Nonaqueous electrolyte energy storage device
2: Electrode assembly

3. The positive active material according to claim 1, wherein the oxide is represented by the following formula (1):

$$[Li_{2-2y}M_{2x}]O \qquad (1)$$

(wherein M is Co, Fe, Cu, Mn, Ni, Cr or a combination thereof, and x and y satisfy 0.10≤x<1 and x≤y<1).

4. The positive active material according to claim 3, wherein 0.25≤y<1.

5. A positive electrode for a nonaqueous electrolyte energy storage device, comprising the positive active material according to claim 1.

6. A nonaqueous electrolyte energy storage device comprising the positive electrode according to claim 5.

7. A method of producing the positive active material according to claim 1, the method comprising treating an oxide, containing a lithium transition metal oxide having a crystal structure belonging to an inverse fluorite structure, by a mechanochemical method, wherein the lithium transition metal oxide contains cobalt, iron, copper, manganese, nickel, chromium or a combination thereof as the transition metal element M, and a molar ratio (M/(Li+M)) of a content of the transition metal element M to a total content of lithium and the transition metal element M in the oxide is 0.10 or more.

8. A method of producing a nonaqueous electrolyte energy storage device, the method comprising:

producing the positive active material by the method according to claim 7; and producing a positive electrode by applying a positive composite paste to a positive substrate and drying the positive composite paste, the positive composite paste including the positive active material.

9. A method of producing a nonaqueous electrolyte energy storage device, the method comprising producing a positive electrode by applying a positive composite paste to a positive substrate and drying the positive composite paste, the positive composite paste including the positive active material according to claim 1.

10. The positive active material according to claim 1, wherein the ratio (Ia/Ib) of peak intensity Ia appearing in the range where 2θ is 20 to 25° and peak intensity Ib appearing in the range where 2θ is 30 to 35° is 0.5 or more and 0.8 or less.

\* \* \* \* \*